United States Patent Office 3,077,352
Patented Feb. 12, 1963

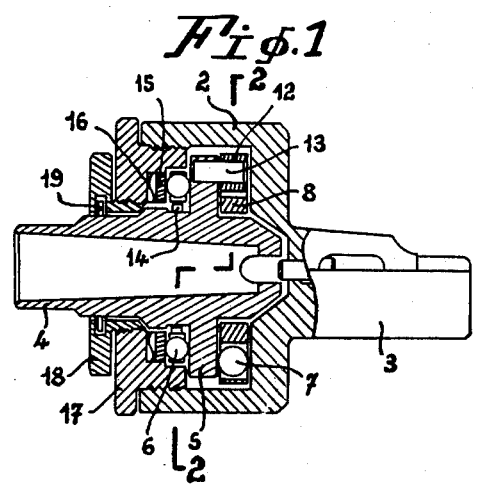
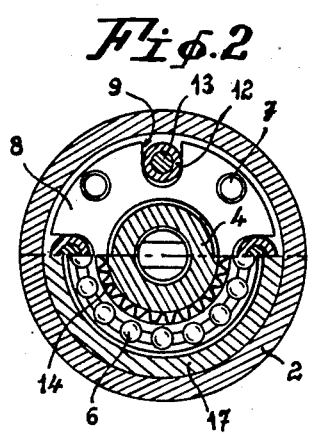

3,077,352
FLOATING CHUCK
Jean Auguste Christophe van Straaten, 12 Quai de Serbie,
Lyon 6e, France
Filed Mar. 29, 1961, Ser. No. 99,218
Claims priority, application France Apr. 4, 1960
3 Claims. (Cl. 279—16)

This invention relates to chucks adapted for supporting a tool. More particularly the invention relates to improvements in chucks of the floating type in which a tool holder and chuck body are adjustably supported relative to one another to correct for misalignment.

In certain machine tools such as, in particular, semi-automatic lathes, slide lathes or boring machines, it is difficult to use reamers properly for the execution of perfectly gauged bores having an excellent surface condition. This difficulty is due to a misalignment which, in the case of semi-automatic lathes, is ascribable to an expansion of the headstock during operation and, in the case of slide lathes, is generally ascribable to wear.

It has been proposed already to use so-called floating chucks including a socket inside which the tool is fitted and terminating with a plate housed between two bearing surfaces formed in the chuck body and which allow, at least in theory, compensation for misalignment. In practice, however, it is impossible to make the plate slide by reason of its friction against the bearing surfaces, which friction is too great to allow such a sliding.

In order to eliminate such drawbacks, I have designed a floating chuck of the above-mentioned type, wherein the plate which is rigid with the tool-carrying socket, is movably inserted between a ball race which is held in a centered position with reference to the socket by a spring, and balls housed inside a plate parallel with the first-mentioned plates and having, for example, four notches of which two are engaged by two rollers carried by the plate rigid with the tool-carrying socket while the two other notches are engaged by rollers carried by the chuck body.

I have illustrated, by way of example and by no means in a limited sense, in the accompanying drawings, a preferred embodiment of my improved chuck. In said drawings:

FIG. 1 is a longitudinal sectional view of said chuck, while

FIG. 2 is a transverse sectional view through line 2—2 of FIG. 1,

In the drawings, 2 designates the body of the chuck rigid with a tail-piece 3 through which it is fitted on the machine-tool. 4 designates the socket inside which the tool is fitted, and terminating inside the body 2 of the chuck with a plate 5.

According to the invention, one of the surfaces of said plate 5 engages a ball race 6, while its other surface engages an annular series of balls 7 housed in recesses formed inside a floating plate 8 provided with notches 9 serving as bearings for the driving rollers 12. In the embodiment showing four notches are provided, however, applicant does not limit himself to this specific configuration since other quantities of notches could be provided. The rollers 12 are revolvably carried by studs 13 some of which are rigid with the socket plate 5, while the others are rigid with the body of the chuck 2. Said studs are arranged, in the case illustrated, at 90° from each other round a common axis. The ball race 6 is centrally carried by the socket 4 as provided by a pleated annular spring 14; said ball race is held laterally by an annular plate 15 urged against the ball race, by an elastic washer 16, which is held in place by a nut 17 screwed into the body 2 of the chuck. Inside said nut, is screwed a further nut 18 and a packing 19 is provided between said nut 18 and the socket 4. Said nut 18 allows centering the floating plate 5 and consequently the socket 4 along the axis of the chuck and, upon unscrewing, and release of said nut, the socket can be adjusted to provide the minimum radial clearance required for the correction of any misalignment.

What I claim is:

1. A floating chuck comprising a tool-holding socket, a plate coaxially rigid with said socket having opposed lateral surfaces, an annular spring fitted over the socket, a ball race fitted centrally over the socket and engaging one of the lateral surfaces of the first-mentioned plate, the ball race being supported by the annular spring to be resiliently maintained in position around said socket, a floating plate parallel to the first-mentioned plate and including balls therein engaging the other lateral surface of said first plate, said floating plate being provided with a plurality of openings arranged around a common center, studs rigid with said first plate and less in number than the openings in the floating plate, each stud engaging a corresponding opening in the floating plate, a chuck body surrounding the socket and including further studs rigid with said body and engaging corresponding openings in the floating plate to provide for the angular synchronous rotation of the body and chuck, and means supported by the body and urging the ball race against the cooperating surface of the first-mentioned plate.

2. A floating chuck as claimed in claim 1 wherein the means urging the ball race comprises an annular plate engaging the ball race, a spring washer engaging said annular plate and a nut threadably engaged with said chuck body and coaxial with the same engaging said spring washer to adjustably urge the same against said annular plate.

3. A floating chuck as claimed in claim 2 further comprising a further nut threadably engaged in the first said nut in coaxial relation therewith and adjustable therein to engage said socket to permit adjustment between the socket and said body.

References Cited in the file of this patent
UNITED STATES PATENTS

| | | |
|---|---|---|
| 2,042,648 | Ziegler | June 2, 1936 |
| 2,525,646 | Burg | Oct. 10, 1950 |
| 2,886,354 | Bjorklund | May 12, 1959 |